(12) United States Patent
Cai et al.

(10) Patent No.: US 11,836,656 B2
(45) Date of Patent: Dec. 5, 2023

(54) COGNITIVE ENABLED BLOCKCHAIN BASED RESOURCE PREDICTION

(71) Applicant: INTERNATIONAL BUSINESS MACHINES CORPORATION, Armonk, NY (US)

(72) Inventors: Zhuo Cai, Beijing (CN); Bing Xin Wang, Beijing (CN); Kushal Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 16/562,536

(22) Filed: Sep. 6, 2019

(65) Prior Publication Data
US 2021/0073699 A1 Mar. 11, 2021

(51) Int. Cl.
*G06Q 10/0631* (2023.01)
*G06N 20/00* (2019.01)
(Continued)

(52) U.S. Cl.
CPC ..... *G06Q 10/06312* (2013.01); *G06F 9/5005* (2013.01); *G06F 9/541* (2013.01);
(Continued)

(58) Field of Classification Search
CPC ......... G06N 20/00; G06F 9/541; G06F 9/542; G06F 9/5005; G06Q 10/06312;
(Continued)

(56) References Cited

U.S. PATENT DOCUMENTS

| 10,423,674 B1* | 9/2019 | Burriesci ................ H04L 67/02 |
| 2014/0172653 A1 | 6/2014 | Sribhibhadh |

(Continued)

FOREIGN PATENT DOCUMENTS

| CA | 2938758 A1 | 2/2017 | |
| CN | 106682762 A * | 5/2017 | ......... G06Q 30/0203 |

(Continued)

OTHER PUBLICATIONS

Bloomberg Content Service, "Metadata Matters", How Metadata Can Help Media Companies Succeed, Solutions for Media, 15 pages, https://data.bloomberglp.com/mld/sites/6/2015/08/140814-Metadata-Whitepaper.pdf, 2015.

(Continued)

*Primary Examiner* — Charles E Anya
(74) *Attorney, Agent, or Firm* — Andre Adkins (57) ABSTRACT

A method, computer system, and a computer program product for blockchain based resource predictions and management is provided. Embodiments of the present invention may include receiving a request for a prediction of a future resource requirement. Embodiments of the present invention may include loading data structures. Embodiments of the present invention may include classifying collected data. Embodiments of the present invention may include predicting the future resource requirement. Embodiments of the present invention may include adjusting the priority of the future resource requirement. Embodiments of the present invention may include providing notifications.

20 Claims, 6 Drawing Sheets

(51) Int. Cl.

| | |
|---|---|
| *G06F 9/50* | (2006.01) |
| *G06F 9/54* | (2006.01) |
| *H04L 9/06* | (2006.01) |
| *G06F 18/24* | (2023.01) |
| *G06Q 50/02* | (2012.01) |
| *H04L 9/00* | (2022.01) |

(52) U.S. Cl.
CPC ............ *G06F 9/542* (2013.01); *G06F 18/24* (2023.01); *G06N 20/00* (2019.01); *G06Q 10/06315* (2013.01); *H04L 9/0643* (2013.01); *G06Q 50/02* (2013.01); *H04L 9/50* (2022.05)

(58) Field of Classification Search
CPC ............ G06Q 10/06315; G06Q 50/02; G06K 9/6267; H04L 9/0643; H04L 2209/38
See application file for complete search history.

(56) References Cited

U.S. PATENT DOCUMENTS

| | | | | |
|---|---|---|---|---|
| 2018/0276600 | A1* | 9/2018 | Fuller | H04L 9/3236 |
| 2018/0285810 | A1* | 10/2018 | Ramachandran | G06F 16/27 |
| 2018/0314949 | A1* | 11/2018 | Bender | G06Q 50/02 |
| 2018/0330281 | A1* | 11/2018 | Teller | G06N 20/00 |
| 2018/0365775 | A1* | 12/2018 | You | G06Q 30/0205 |
| 2019/0050948 | A1* | 2/2019 | Perry | G06V 20/188 |
| 2019/0108631 | A1* | 4/2019 | Riley | G06T 7/00 |
| 2019/0137987 | A1* | 5/2019 | Cella | G05B 23/0286 |
| 2019/0370915 | A1* | 12/2019 | Garden | G06Q 10/1097 |
| 2021/0056606 | A1* | 2/2021 | Achkir | G06Q 30/0623 |

FOREIGN PATENT DOCUMENTS

| | | | | |
|---|---|---|---|---|
| CN | 107895210 A | * | 4/2018 | ............ G06Q 50/02 |
| WO | 2016029119 A1 | | 2/2016 | |
| WO | 2017040313 A1 | | 3/2017 | |

OTHER PUBLICATIONS https://azure.microsoft.com/en-us/solutions/blockchain/, "Blockchain", Develop, test, and deploy secure blockchain apps, Blockchain Technology and Applications | Microsoft Azure, Accessed on Feb. 20, 2019, 18 pages.

Lin et al., "Blockchain and IoT based Food Traceability for Smart Agriculture", ICCSE'18, Jul. 28-31, 2018, Singapore, Singapore, © 2018, ACM, 6 pages.

Mell et al., "The NIST Definition of Cloud Computing", Recommendations of the National Institute of Standards and Technology, Special Publication 800-145, Sep. 2011, 7 pages.

Notification of Transmittal of The International Search Report and Written Opinion, Applicant's file reference P201809023, International Application No. PCT/EP2020/074350, dated Oct. 26, 2020, 12 pages.

Putrevu, "Blockchain-powered startup Agri10x puts farmers first with a decentralised approach", Jul. 10, 2019, pp. 1-5.

Wikipedia, "Blockchain", Aug. 30, 2019, Blockchain-Wikipedia, pp. 1-20.

Asharaf, et al., "Decentralized Computing Using Blockchain Technologies and Smart Contracts: Emerging Research and Opportunities," A Volume in the Advances in Information Security, Privacy, and Ethics (AISPE) Book Series, IGI Global Disseminator of Knowledge, www.igi-global.com, ISSN: 1948-9730, Abstract Only, 2017.

* cited by examiner

COGNITIVE ENABLED BLOCKCHAIN BASED RESOURCE PREDICTION

BACKGROUND

The present invention relates generally to the field of computing, and more particularly to predictive analytics using blockchain. The resource needs of a population may not be predicted efficiently due to a lack of current and historical transactional information associated with the resource. The time period may be extended and lengthy for resources to reach a population due to incorrect predictions about the amount of resources that are optimal or required, a lack of organization of the resources and potential transportation route issues of the resources. Additionally, if the resource is perishable, waste may occur.

SUMMARY

Embodiments of the present invention disclose a method, computer system, and a computer program product for blockchain based resource predictions and management. Embodiments of the present invention may include receiving a request for a prediction of a future resource requirement. Embodiments of the present invention may include loading data structures. Embodiments of the present invention may include classifying collected data. Embodiments of the present invention may include predicting the future resource requirement. Embodiments of the present invention may include adjusting the priority of the future resource requirement. Embodiments of the present invention may include providing notifications.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, the resource needs of a population may not be predicted efficiently due to a lack of current and historical transactional information associated with the resource. The time period may be extended and lengthy for resources to reach a population due to incorrect predictions about the amount of resources that are optimal or required, a lack of organization of the resources and potential transportation route issues of the resources. Additionally, if the resources are perishable, waste may occur. Third-party vendors may also be organizing and transporting a resource to fill a demand, for example, to a particular location, city, town or island. Since many different channels may possess the resource during various transportation routes and through the possession of one or more vendors, the time period may further be extended in which the resources may reach a consumer. Additionally, if the resource is a potential life saving resource, such as medication, then the inaccurate prediction or extended time for the resource to reach the consumer may create an adverse effect. Inaccurate predictions, historical transactions and the organization of resources and products may create either waste in the case of perishable items or may create an adverse effect to the consumer, the population, the company, the business or the vendor of the resource or product.

As an example of some instances when mishaps in the timing or the organizing of resources can occur may include healthcare products not including mechanisms to organize a healthy food supply based on consumption needs, providing information of certain types of food requirements based on the nature of the population, prediction mechanisms that lag in providing medical and food requirements to fill the need of a specific area and inconsistent communication to farmers for future supply requirements.

Therefore, it may be advantageous to, among other things, create an accurate predictive model on a blockchain network to determine precise resource needs and records and to organize the resource transactions such that the people, companies or industries that create, transport and sell the resource have accessibility to a transaction ledger that contains the current and historical details relating to the resource amount, orders, location and transportation.

The following described exemplary embodiments provide a system, method and program product for accurate resource predictions on a blockchain network. As such, embodiments of the present invention have the capacity to improve the field of resource management by using various collected data, predictive analytics with a blockchain based resource manager to create an efficient assistant and transactional environment for all parties involved in the transaction.

More specifically, the predictive analytics will assist the resource generator or food generator in managing the production of future food requirements, will provide a cost savings to the food generator by reducing the waste of overproduction, will provide a new income stream that will allow the food generator to meet a different resource need in a community and will stabilize the resource market. The blockchain based resource manager may assist the resource generator or food generator in managing the resource to reach the consumers, such as the transportation companies, the shipping companies, the individuals who work in creating the resources, third-party vendors, stores that sell the product and the consumers. The system, method and program product may create a platform for an AI based approach to determine future resource or food requirements based on a population. The platform may be considered a resource as a service (RaaS) or a food to crop as a service (FCaaS) and may be implemented as an assistant to resource producers and all parties involved in making the resource available to the public.

A resource may include, for example, a product or a service. Information relating to the resources that may be monitored, stored, analyzed and tracked may include, for example, a product name, a creation date for the product, an expiration date for the sale of a product, statistics for food consumption for a region or population, food requirements for a person with a certain medical condition or allergy, medical equipment needed for certain procedures, medical procedures and prescriptions associated with a medical condition, population movement and size, population growth or decline, economic balances and economic imbalances of a region or location. Transactional information relating to resources may include information such as time, date, locations, transportation, temperature, weather, sensor readings, allocation, parties involved, supply, demand, inventory, pricing, raw materials needed to create the product, shipment details or current orders.

According to an embodiment, predictions relating to resource needs, such as resource allocation, amounts and locations, may be made using artificial intelligence (AI) and machine learning (ML) using historical and real-time or current data. Historical data may include, for example, information obtained from public repositories or private repositories upon having proper authority to access, such as a hospital administrative staff having access to medical supply records when ordering new supplies or recording current supplies. Historical and current data may include information relating to features and measurements associated with resources such as the amount, the freshness, the temperature, the weight and the decay of a food shipment from a farm or an expiration date.

Historical data and current data may be used for analysis and transmitted to a corpus, a database or a knowledgebase that stores machine training data, the collected real-time data, the collected historical data, the predictive results, blockchain based food tracking data, AI based food predictor data, transaction details, location details, sensor readings and measurements, transportation updates and information relating to the parties involved in the transaction. The transaction information relating to the resource may also be stored and processed on a blockchain network. Current data may, for example, be received from an internet of things (IoT) device or sensor, a global positioning system (GPS), a sensor, a smart watch, a smart phone, a smart tablet, a personal computer or an automotive device. In addition to public repositories and private repositories, personal preference data of one or more individuals may be collected by various methods, with end user consent. For example, data collection methods may include data transmitted from an end user for the purposes of providing data relating to an interest in particular resources. The data may be collected by type-written messages, video content, audio content or biometric content provided by the end-user. An end user may be an individual who may have an interest in receiving or purchasing the resource or an individual why may provide data for potential future interest in a resource.

According to an embodiment, for current and historical data being collected from an individual, such as end user profile data, end user preference data, end user biometric data or end user feedback data being transmitted to and received by computing devices, a blockchain resource program may receive consent or a response from the end user, via an opt-in feature or an opt-out feature, prior to commencing the collecting of data or the monitoring and analyzing of the collected data. For example, in some embodiments, the blockchain resource program may notify the end user when the collection of data begins via a graphical user interface (GUI) or a screen on a computing device. The end user may be provided with a prompt or a notification to acknowledge an opt-in feature or an opt-out feature. The end user may include a person from whom data is collected from relating to the resource. A user may include an individual, a party to the transaction, a vendor, a producer of the resource or a company who may use the collected data to create efficiency of the resource from before the time the resource is produced to the time the resource reaches the end-user, the general population or a particular location.

According to an embodiment, predictive analytics may be used by analyzing the collected, current and historical, data to predict the amount of resources that may be needed for a location or population. Industries that provide resources may include a producer of a good or service, for example, industries such as healthcare, medical, pharmaceutical, agriculture, farming, business, legal, environmental, governmental, technology, industrial, transportation or supply chain. Various types of ML models may be built and used to create predictive analytics and results for the various industries. ML models may also include deep learning models and neural networks. Training and updating a ML model may include supervised, unsupervised and semi-supervised ML procedures. Supervised learning may use a labeled dataset or a labeled training set to build, train and update a model. Unsupervised learning may use all unlabeled data to train a model. Semi-supervised learning may use both labeled datasets and unlabeled datasets to train a model.

Cognitive analysis, such as natural language processing (NLP), may be used during the building and continued training of a ML model. The cognitive analytics may analyze both structured and unstructured data to be incorporated into the ML process. NLP may be used to analyze the quality of the collected data, the feedback provided by an individual or by individual preferences. Structured data may include data that is highly organized, such as a spreadsheet, relational database or data that is stored in a fixed field. Unstructured data may include data that is not organized and has an unconventional internal structure, such as a portable document format (PDF), an image, a presentation, a webpage, video content, audio content, an email, a word processing document or multimedia content. The collected data may be processed through NLP to extract information that is meaningful to a user, an end user, an individual, a population or a party to the transaction.

According to an embodiment, data retrieved from a blockchain network, such as a blockchain based resource tracking system, may be used in conjunction with the collected data and the results from one or more predictive analytics to increase the accuracy of resource production and communication between all parties to the transaction. A blockchain network may also be used to store a knowledgebase created by all the collected data and to create an immutable ledger of the predictive results and transactions relating to the resource. Additionally, the blockchain network may secure the records associated with the transactions relating to the resource.

Blockchain technology may include a shared log of events that are kept in blocks of data that may be passed to the next transaction in a linear order. A block may contain the data of one or more records or transactions. A block may hold or store the data before the block has been completed, prior to consensus and prior to being transferred to the next block in a blockchain, for example, using a transaction pool, a memory pool or a candidate block. A block may also be a block of one or more records or transactions attached to a blockchain, for example, a transaction that has been permanently appended and recorded to the files in a blockchain.

With blockchain technology, for example, when a transaction is written into a ledger, there may be a mechanism to make sure all the records are synchronized and if the network system detects an error, the error may be immediately corrected. Blockchain systems are immutable since a hash value on each block may be created and any change or amendment in data will show a different hash value. Each block may contain the hash of the previous block and the current transactions before the next hash may be created. Once consensus is reached, the data may be verified. Each block may have a hash value of the previous block in the chain and there may be no way to modify the data in the previous block. If the data is modified, the modified data may be detected by a re-calculated hash value. A different hash value may show that the network system has been compromised.

Parallel blockchains and sidechains may allow for improved scalability using alternative and independent blockchains. Sidechains may allow ledger data to be transferred to other blockchains. A signature of a blockchain network may be used to make a connection with sidechains to allow data or assets (e.g., tokens, digital assets or transactional data) to be securely moved among blockchains. A sidechain may handle unique functions, such as a function that may require large processing power or a different function that may require a large number of transactions.

Miners or miner nodes may be used in a blockchain network to authorize transactions and provide security. A created block or transaction details may be transmitted to a miner or a miner node. The miner may have limited power, such as the ability to create a block using a transaction, reorder a transaction, remove a transaction or translate a blockchain from one node to a different node. The miner may not, for example, have the ability to provide consensus to create a blockchain from a list of transactions.

Blockchain technology may be used for a network system to have consensus, trust, accountability, transparency, authenticity, immutability and finality of the logged transactions or events. Additionally, smart contracts may be used in the network system and may allow particular permissions to access, write to or control the flow of data. Blockchain technology allows for peer-to-peer interaction without the need for a central authority, thus, creates a decentralized environment.

According to an embodiment and using food supply as a use case example, ML model predictions may be made relating to a resource, in this case food or food products, to predict the availability of the food, the food purchasing patterns, the food preferences, the health patterns of a population, the activity patterns of a population, the commuting patterns to purchase products of a population, exercise patterns of a population and consumption patterns of a population. A population of people may include certain areas, locations, cities, towns, counties, states, countries or islands. The predictions may be made based on information collected, for example, from a public internet repository, from public social media information, from a blockchain based resource tracker system, from an AI based resource predictor system, from public product internet reviews and from accessibility to preference data collected from individuals or end user that made the information available to the public or that provided access to the information, for example, in a survey or by allowing access to the preference data.

Consumer and population habits may be analyzed, such as food purchasing habits, seasonal food purchasing habits and seasonal migration of people to a location. Historical purchases and environmental parameters may also be analyzed. Environmental parameters may include, for example, normal weather patterns, unusual weather patterns, natural disasters, pollution factors, a large amount of precipitation, a lack of precipitation, record high temperatures or record low temperatures.

According to an embodiment, the ML model may be used, for example, by farmers and other food producing entities to provide up-to-date knowledge and feedback to the respective people in the production process and to manage and maintain the food items while taking into consideration the needs of the population of certain areas. An increasing global population may require a more accessible and sophisticated way for the food producing industries or manufacturing industries to manage the food supply or products based on time and the shifting nature of the consumer.

According to an embodiment, a blockchain based resource manager may be operated in conjunction with information resources available and the collected data to manage the resources. A blockchain based resource manager may include, for example, ledger architecture that has a ledger state database and a blockchain network. The ledger state database may store ML models and a knowledgebase and blocks in the blockchain network may store and control the tracking of the resource data and transactions. Information resources may include, for example, data gathered from an AI based resource predictor. The ML model predictions may be used by the blockchain based resource manager to predict the supply and demand of the resources based on the collected data. The blockchain based resource manager may also be used to manage the production and the transport of the resources. The predictions and the management of the resources may assist resource generators, for example, farmers, with a more accurate prediction of the amount of food to grow for a particular season.

According to an embodiment, the generated ML model resource predictions may be made available to respective parties, such as parties related to the production of the resource, transportation of the resource, vendors of the resource or the end consumer. For producers of a resource, the predictions may be made in real time by a virtual assistant. For example, a computing device, a robot, an unmanned terrain vehicle or an unmanned aerial vehicle may serve as an assistant to a farmer while the farmer is working on the land. The robot may physically co-exist with the farmer and may be able to predictively answer the farmers questions about the current and future crops, supply needed to produce for a season, latest news on other similar crops that may have setbacks due to weather in a different region or the changes in the amount of demand for the product.

The virtual assistant may physically co-exist with the resource creator, the third-party vendor, the transporter of resources or other parties involved between the creation of the resource and the delivery of the resource to the end consumer. The assistant may consider all collected data parameters and suggest optimal and priority-based decisions. For example, when the ML model is needed to make a prediction based on rainfall and temperature for certain crops that are more sensitive to rainfall and temperature changes, then the blockchain resource program may re-prioritize decisions to maximize the crop output with the least amount of waste. A priority engine may use patterns from the ledger database and suggest the best resource production and time frame for a particular population or location.

Application programming interface (API) infrastructure may be used, for example, to provide information to the blockchain resource program about a famous crop in the area and the API may obtain the current status of the crop in the selected area via integrating a global positioning system (GPS) enabled farming service to ensure the resource supplies get streamlined to the farm and from the farm such that efficient usage of the resources will be achieved with minimal resource wastage.

According to an embodiment, performing accurate measurements of resource estimations may be made by analyzing the ground level aspects to provide benefits to resource management for a growing population. Data may be collected by APIs relating to, for example, a flooded crop in one region. The flooded crop may cause a higher demand for the healthy crops and the API collected data my update the AI engine or the ML model for a current and accurate demand for the product. For example, an AI engine or ML model will learn and forecast for the demand of a specific crop, such as spinach, for each day after 3 months from now. Using the data obtained for each day after 3 months, the AI engine will instruct farmers or farming equipment automatically to ensure the spinach plants mature in the exact manner as the plants are needed in the market. The forecasted and accurate timeline will create a fresh supply of the resource daily to customers with minimal leftovers and minimal waste.

The resulting predictions may be transmitted, for example, to a farmer or other representative parties for the purpose of making decisions about crop timing, crop outputs and the resources needed to obtain the estimated timing and outputs. Additional resources may be required based on the resource predictions, such as adjustments to the number of workers, the amount of soil, seeds or equipment. Additionally, shifting predictions may, for example, show that a particular population is gaining a higher interest in health which may create an increased demand in certain produce.

Suggestions resulting from predictions may include history-based learning models and models that adjust over time by monitoring resource supply and demand levels based on real-time utilization of resources. Information as a service (IaaS) and platform as a service (PaaS) providers may be used in a cloud computing environment in conjunction with resource as a service (RaaS) or a food to crop as a service (FCaaS) to deliver predictive resource services to many different parties involved in the resource production, such as the farmers or the producers, the transporters, the vendors and the consumer. For example, consumers, chefs or restaurant owners may receive notifications on a food service application relating to dates and locations that fresh produce may become available. Accurate predictions may also enable manufacturers of embedded devices, such as IoT devices and sensors, to efficiently monitor the consumer needs and shifting demand.

According to an embodiment, the blockchain based resource manager may be used, for example, to maintain various levels of data labels, data tags and metadata to track the overall product process for product enhancement purposes from resource creation to providing the resource to the end user or consumer. The blockchain based resource manager may optimize and enhance, for example, food consumption forecasting with multiple parameterized variable levels. Parameters may be incorporated from varying sources and parameterized variables may include, for example, shipment locations, food crop timing, weather issues, product manufacturing adjustments or transportation timing that may affect the resource price and delivery time to customers.

According to an embodiment, the food production may be traced, creating food crop as a service (FCaaS). Food suggestions and requirements based on the nature of a population may be created by transforming the collected data using ML models within a blockchain network to data that is transmitted to food producers and parties involved in bringing the food to the consumer. The transformed data will provide assistance to, for example, a farmer by providing information relating to population changes, population fads and changing demand for products that will give insight as to how much production should be fulfilled and the timing in which the production should be offered to the consumer. The translated data will assist the respective food producers in time to address a smooth food generation and consumption chain based in a blockchain network, and thus, will create a better economic balance to the production, costs, waste and supply. For example, by predicting, accurately, an estimated demand for a product, all parties involved in the FCaaS chain will have the ability to accurately supply the end users and perform optimally based on the accuracy of the predictions.

Figure 1:
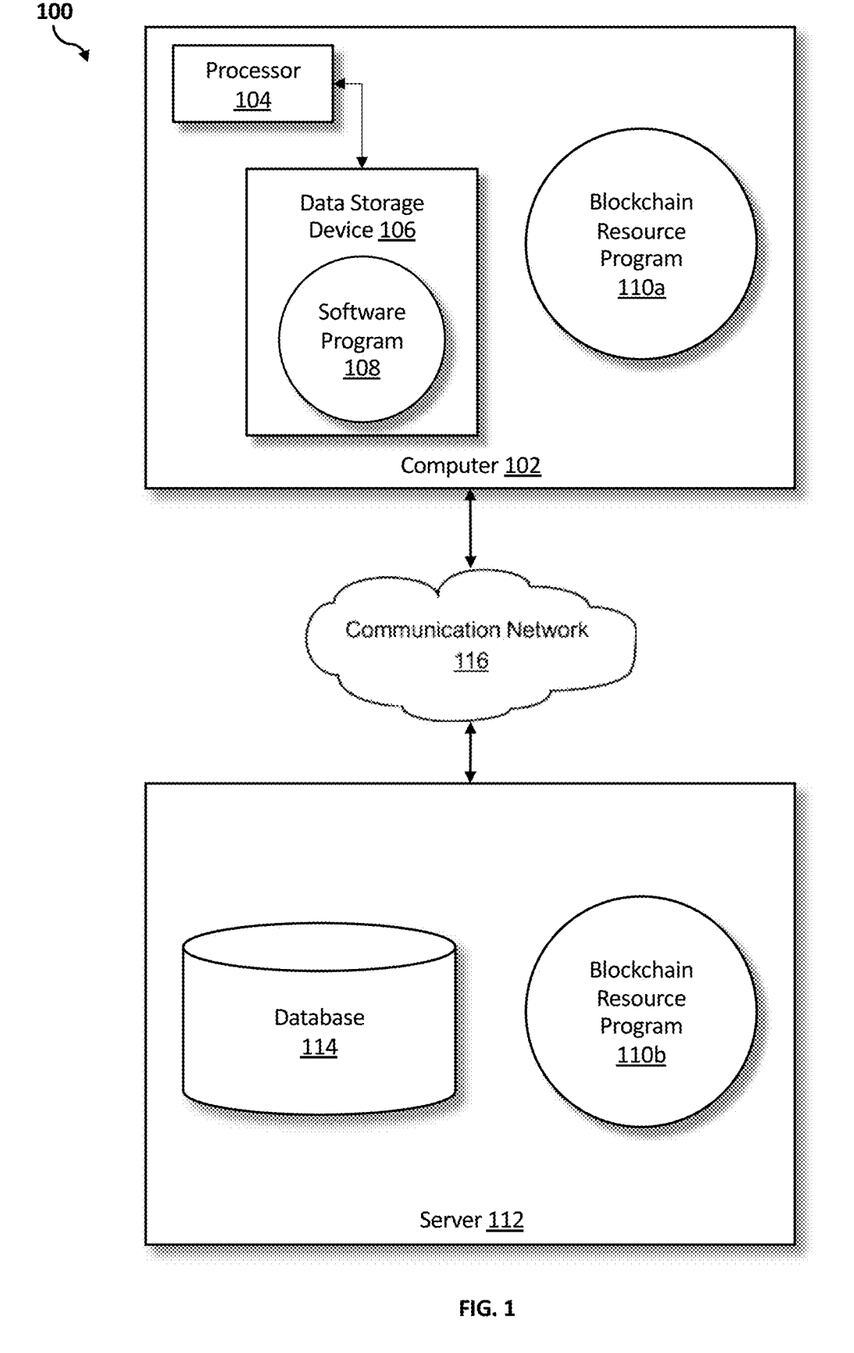
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a blockchain resource program 110a. The networked computer environment 100 may also include a server 112 that is enabled to run a blockchain resource program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the blockchain resource program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the blockchain resource program 110a, 110b (respectively) to predict and cognitively recommend methods to a resource producer for accurate production values. The cognitively enabled blockchain resource method is explained in more detail below with respect to FIGS. 2 and 3.

Figure 2:
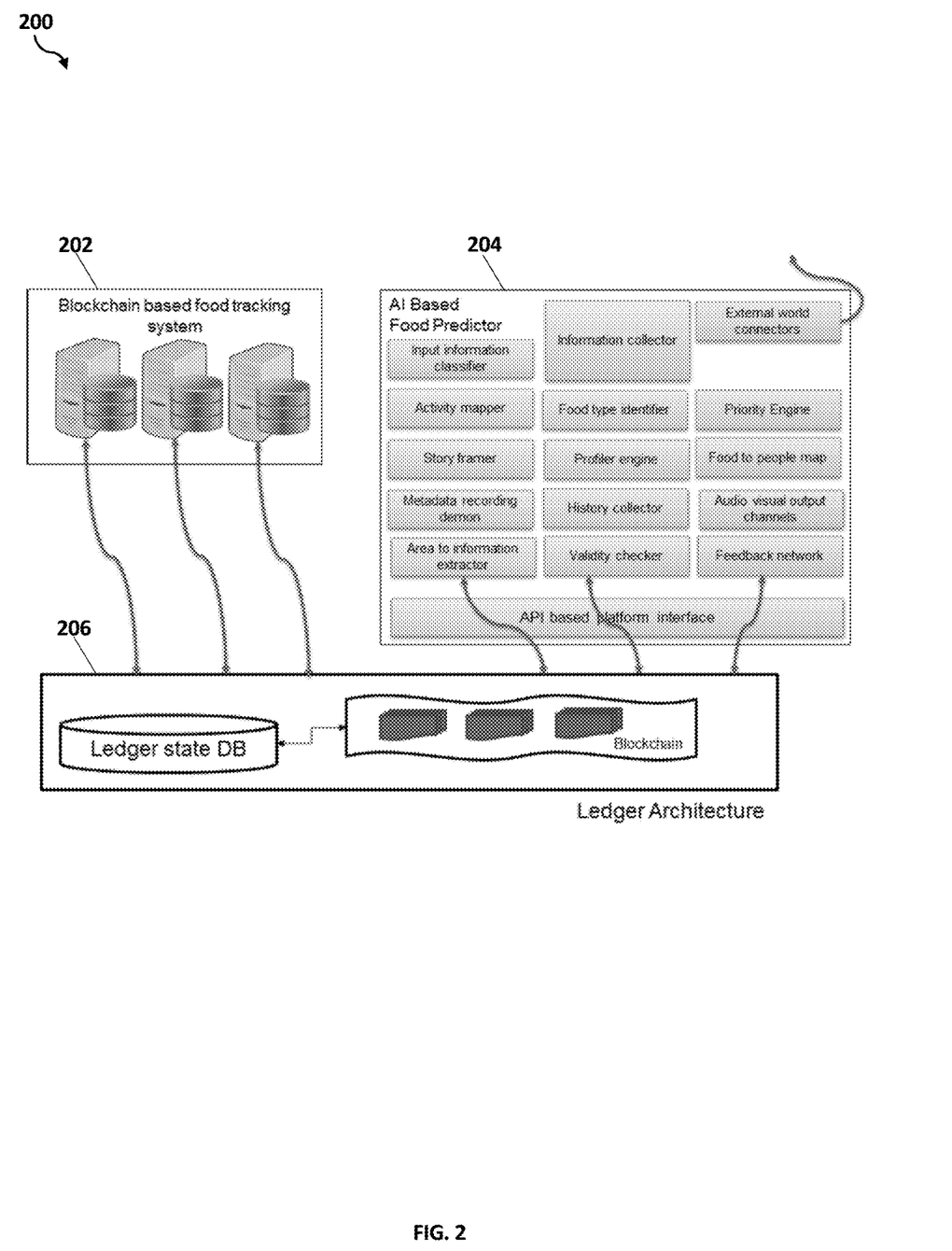
FIG. 2 is a block diagram of a use case example of the blockchain based food tracking system according to at least one embodiment.

Referring now to FIG. 2, a block diagram of a use case example of the blockchain based food tracking system 200 used by the blockchain resource program 110a, 110b according to at least one embodiment is depicted. A blockchain based food tracking system 202 may be stored on one or more server computers (e.g., server 112) and may communicate with a ledger architecture 206. An example of a blockchain based food tracking system 202 may include IBM® Food Trust (IBM and all IBM Food Trust-based trademarks and logos are trademarks or registered trademarks of International Business Machines Corporation and/ or its affiliates).

The ledger architecture 206 may consist of a ledger state database that receives and transmits data with a blockchain network. The ledger architecture 206 may include a blockchain based consensus network that may communicate with intermediate system layers, such as the blockchain resource program 110a, 110b using API infrastructure. The ledger architecture 206 may also receive and transmit data with an AI based food predictor 204 and a blockchain based food tracking system 202.

The AI based food predictor 204 may combine and analyze the collected data to predict the needs of a population and to provide the information to relative parties involved in creating, transporting and selling the resources to the population. The AI based food predictor 204 may consist of various elements, applications or modules. Elements, applications and modules may include an input information classifier, an activity mapper, a story framer, metadata recording demon, an area information extractor, an information collector, a food type identifier, a profiler engine, a history collector, a validity checker, a priority engine, a food to people map, audio visual output channels, a feedback network, an API based platform interface and external world connectors.

External world connectors may include, for example, a resource location and migration history, audio visual inputs, internet data, a people to culture map, a history crop and yields input, weather information, an end-user corpus, a current resource availability database, resource parameterized insights, history based inputs, a corpus based inventory management database and opted-in end user preference information.

According to an embodiment, the blockchain resource program 110a, 110b may be incorporated into a device or vehicle that may traverse the land or air. For example, a robot may be used that is able to operate physically near a farmer, is able to connect to the AI based food predictor 204 over a communication network 116, is able to obtain estimations and predictions and is able to communicate the estimations and predictions to a farmer as the farmer tends to the crops.

The external world connectors and other intermediate system layers may transmit information to, for example, a voice communication channel, a notification engine or a channel for food managing stakeholders. The voice communication channel and the notification engine may include, for example, audio-visual methods of communicating with a user, such as alerts and notifications via a speaker or a computing screen via a GUI. A channel for food managing stakeholder may include, for example, a list of subscribers that are invested or interested in a resource being manufactured or interested in updates regarding a particular produce crop. The subscribers may receive push notifications relating to resources of interest and any changes to the production, order sizes, supply, demand, transportation, prices or weather that may compromise the production.

Figure 3:
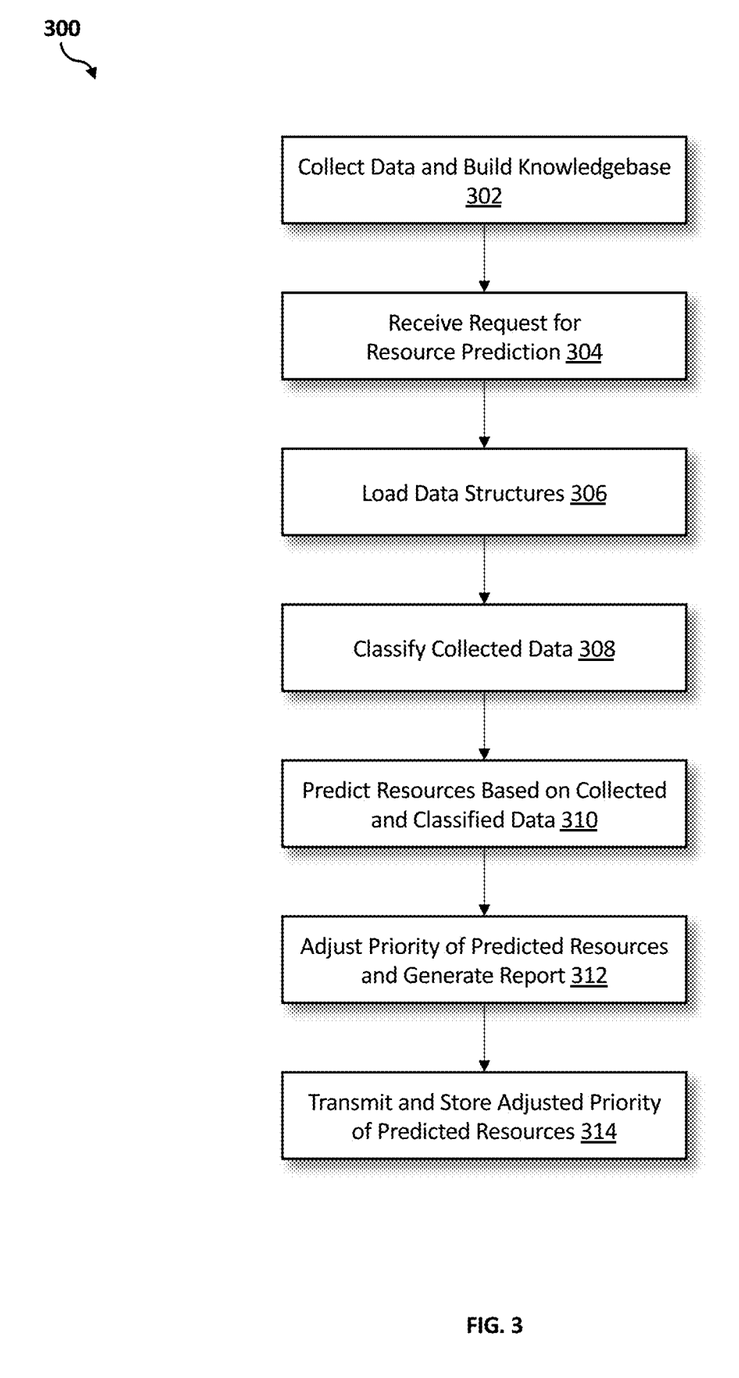
FIG. 3 is an operational flowchart illustrating a process for the blockchain based resource tracking system according to at least one embodiment.

Referring now to FIG. 3, an operational flowchart illustrating the exemplary blockchain based resource tracking process 300 used by the blockchain resource program 110a, 110b according to at least one embodiment is depicted.

At 302, data is collected, and a knowledgebase is built. Collected data may include historical data and current data received by the AI based food predictor 204, external world connectors and the blockchain based food tracking system 202. The collected data may be transmitted to and received on the ledger architecture 206 and the knowledgebase may be built on the ledger architecture 206. Historical data may include, for example, information relating to transactions, features, factors, population research and measurements associated with resources. For example, the production and transactions relating to a food shipment may collect data from orders and transactions of the food and the features related to the food, such as the amount produced, the freshness, the temperature, the weight and the decay of a food shipment from a farm, through one or more transportation services and one or more vendors. Current data may include, for example, an update to a certain population's preferences or resource needs, current transit information based on a vendor manually entering data into a transaction on the blockchain based food tracking system 202 or based on IoT sensors that may be measuring the food quality and location while in transit.

Current and historical data being collected from an end-user or an individual, such as user profile data, user preference data, user biometric data or user feedback data may be used for analysis provided the end user has opted-in by allowing data to be collected and transmitted. Analysis of end-user data may include making predictions based on tracking resources of interest to an end-user for current and future interest of the same and similar other resources. For example, the collected data may be received from external world connectors and may be used by the AI based food predictor 204 to make a prediction of potential resource interests or needs for a population. The AI based food predictor 204 data and the blockchain based food tracking system 202 data may be transmitted to the ledger state database in the ledger architecture 206.

Data received by the ledger architecture 206 may be combined and used to create and build a knowledgebase on the ledger state database for further predictive capabilities, tracking capabilities, estimation capabilities, transactional capabilities or communication capabilities between users or parties involved in the transaction.

At 304, a request is received for a resource prediction. The request may be considered an information collection request made by a multi-level user-set to the ledger architecture 206. The multi-level user-set may include, for example, some or all parties related to the transaction, a stakeholder, a subscriber, an interested consumer, a farmer, a transportation service, a vendor, a stakeholder, a manufacturing plant or an agriculture supply company. The request may be made by the party to make a predictive inquiry about the product or resource.

The request may be transmitted by the ledger architecture 206 to the blockchain based food tracking system 202 and the AI based food predictor 204. Upon request, the blockchain based food tracking system 202 may transmit current data states to the ledger architecture 206 for analysis. The current data stats may include, for example, information related to crops, the time required to grow the crop and time-based requirements and cultivation details regarding an expected arrival time of the product to the market. The blockchain based food tracking system 202 may end the current data state for transmittal to the ledger architecture. For example, in some cases, after a particular event frequency has occurred, the data will be re-collected again for updated predictions.

Once a request is created and transmitted to the ledger state database, the ledger may enable future data predictions demons that use real-time blockchain based data processing demons. Prediction demons and processing demons are continuously running processes that work on event polling. The real-time blockchain based data processing demon may create a faster computational environment for predictions and transactions over the blockchain network. For example, if a request is transmitted to the ledger state database, then the demon processes the data and then returns the processed data. If one of the user's has triggered the request for a fruit crop estimation time, then the request will be submitted to the ledger architecture 206 and then the data gathering may be performed to obtain correct and updated details of the requested fruit crop estimation time.

At 306, the data structures are loaded. Data structures may be loaded to the ledger state database. Data structures may be associated with the request. For example, the state of a particular fruit or vegetable crop cultivation in a region is collected to the ledger state database for further operations to articulate the future supply prediction. Additional related information may also be loaded to the ledger state database if available, such as environmental data or weather data. Upon loading the data structures, a dynamic computation of the resources or platform data may be captured and collected. To collect the dynamic computation of the resources, APIs may be leveraged to transmit a signal to the respective data oceans to collect the required information. Data oceans may include, for example, both structured and unstructured data collected by the sensors and saved on a blockchain network.

API based information collection may include, for example, a history of food consumption for an area or a type of preferred food based on end-user preferences. For example, an area-based information classification can be performed while tagging the information with the region using GPS mechanisms and coordinate management systems based on the inputs received.

At 308, the collected data is classified. Upon collection of the required data, an updated prediction may be made using the ledger architecture 206. The updated prediction may use the loaded data structures and the collected data to further enhance predictions for future resource needs and levels. The data collected from APIs may be classified using a static or dynamic classifier to parse the information insights computation (i.e., the output of the data classification).

Enhanced predictions for future resource needs, for example, future food levels, may be made after the data is classified. For example, activity mapping techniques may be used to obtain local history-based activities of a population. Enhanced predictions may, for example, use the food-based data that is gathered from the blockchain network and a classification of the raw data that provides information for the crop. Hierarchical classification may be used to obtain more details about the crop using general information such as age of the crop, size of the crop or time requirements of the crop. Desired information may be retrieved from the enhanced predictions as the data is classified or becomes classified.

A food type may be identified based on the classified input data and state data collected from the blockchain based food tracking system 202. Food type information is collected and may be publicly available, such as a certain crop needs 4 months to grow, however, application of the collected information while predicting the following 4 month's crop availability may be calculated using classification models with a decision factor based on time.

A food-to-population requirement map may be generated to identify a level of importance for a particular resource for further processing. The food-to-population map may be generated and manipulated using, for example, the internet data of population and an average need for a crop per person which may include historical data.

Additionally, an area information extractor map may provide insights for the food requirement of the population in a particular region and the information extractor map may be used to further predict food demand needs. An information extractor map may provide insights by using implemented classification models with trained models for food-based predictors and also by training datasets.

At 310, resources based on collected and classified data are predicted. Future resource requirements may be predicted based on the classified information from step 308. For example, food requirements for a particular area may be predicted to estimate the harvest of a region based on the weather database and crop dataset collected. Additionally, an estimation relating to the timing requirements of the raw elements of the food items that may include crop generation, resource processing and other meta-transmission delays. Resource processing may include, for example, calculating an estimated timing outcome and quality of a crop. The meta-transmission delays may include, for example, added delays based on shared information within the network of the parties.

At 312, a priority of predicted resources is adjusted, and a report is generated. A priority re-adjustment of the resources may be made, for example, based on discovering in previous predictions that crop X in region A currently has no production capabilities but crop X is being produced in region B. Therefore, predictive adjustments may be made by considering that region A can obtain the food from crop X from region B. The information may be reframed and injected based on the remote virtual assistant responses upon preparation of area-based food and requirement maps. A story framer may create the story that may include stats for the resource items, requirements and processing times.

One or more reports may be generated based on the party category or the sender categories. For example, categories may include a vendor, a resource supplier, a farmer, a transit authority, a transportation authority, a shipping authority or a government authority. The virtual assistant may be invoked to select a communication channel to inform stakeholders and to provide notifications to selected channels.

At 314, the adjusted priority of predicted resources is transmitted and stored. The adjusted priority of predicted resources may be transmitted to some or all parties to the transaction, stakeholders, channels, subscribers and interested consumers. The determination of which parties to notify may be based on the results of the predictions made at step 310 or based on the severity of the changes in the adjusted priority. For example, if one subscriber to a channel notification of the resource generates an inquiry regarding crop A and the predictive response is that crop A will be ready as stated in a previous prediction, then the rest of the subscribers may not be notified of such a similar status unless they opted-in to receive all notifications. Alternatively, if a major storm affected crop A, then all subscribers may receive an alert or a push-notification of a delay in crop A. The adjusted priority of predicted resources may be stored, for example, on the ledger architecture 206 or on the created knowledgebase for future use as historical data.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
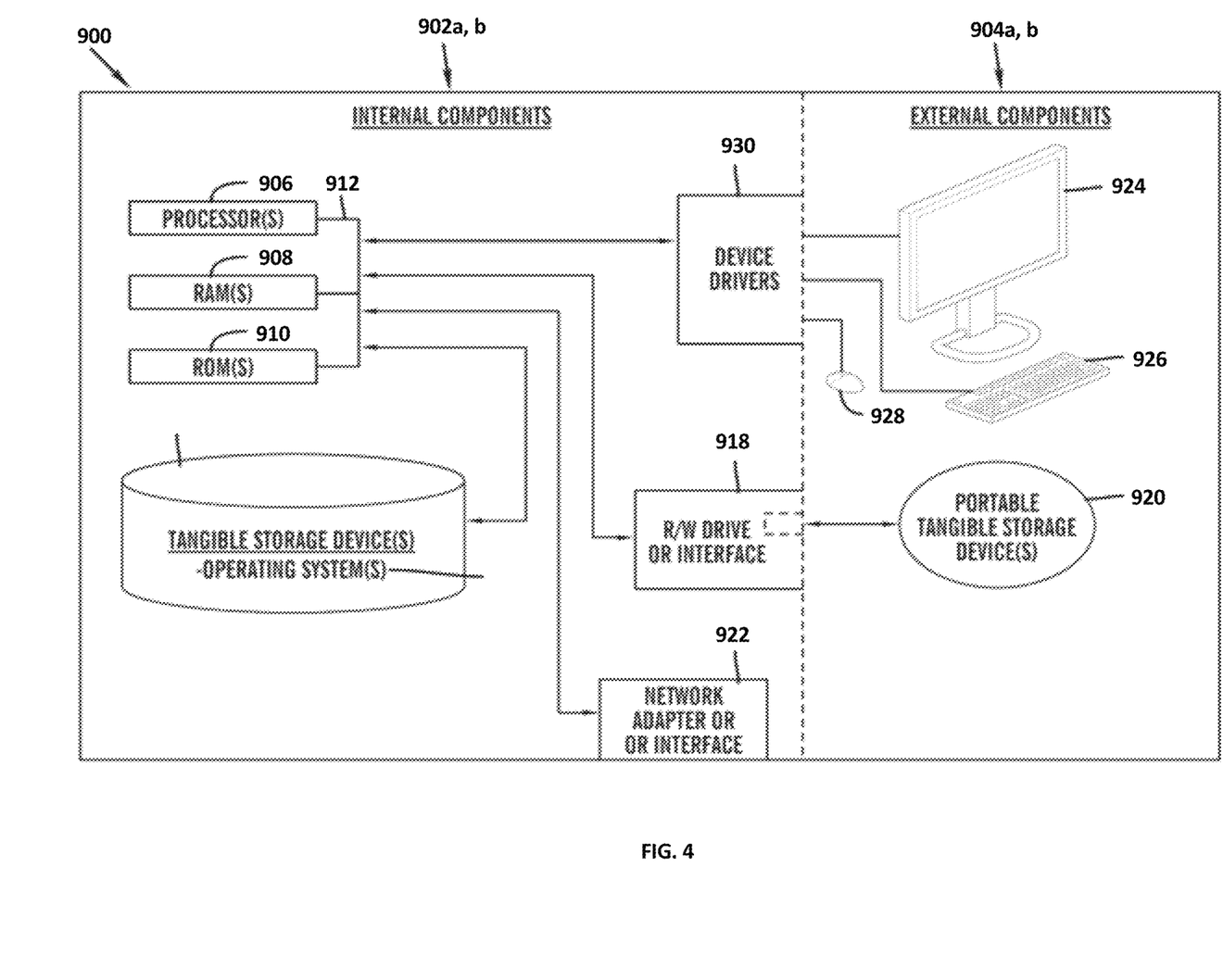
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the blockchain resource program 110a in client computer 102, and the blockchain resource program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the blockchain resource program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the blockchain resource program 110a in client computer 102 and the blockchain resource program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the blockchain resource program 110a in client computer 102 and the blockchain resource program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
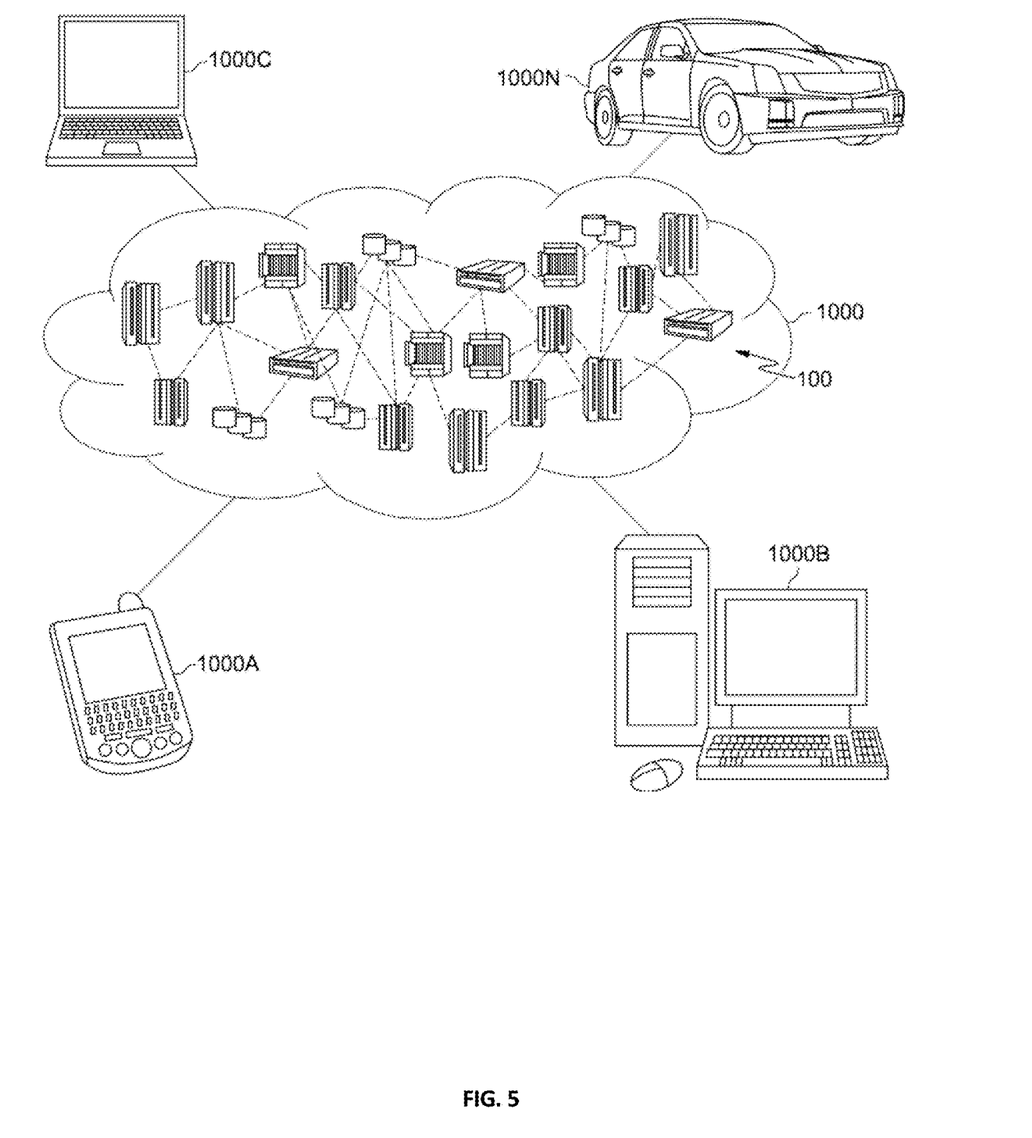
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
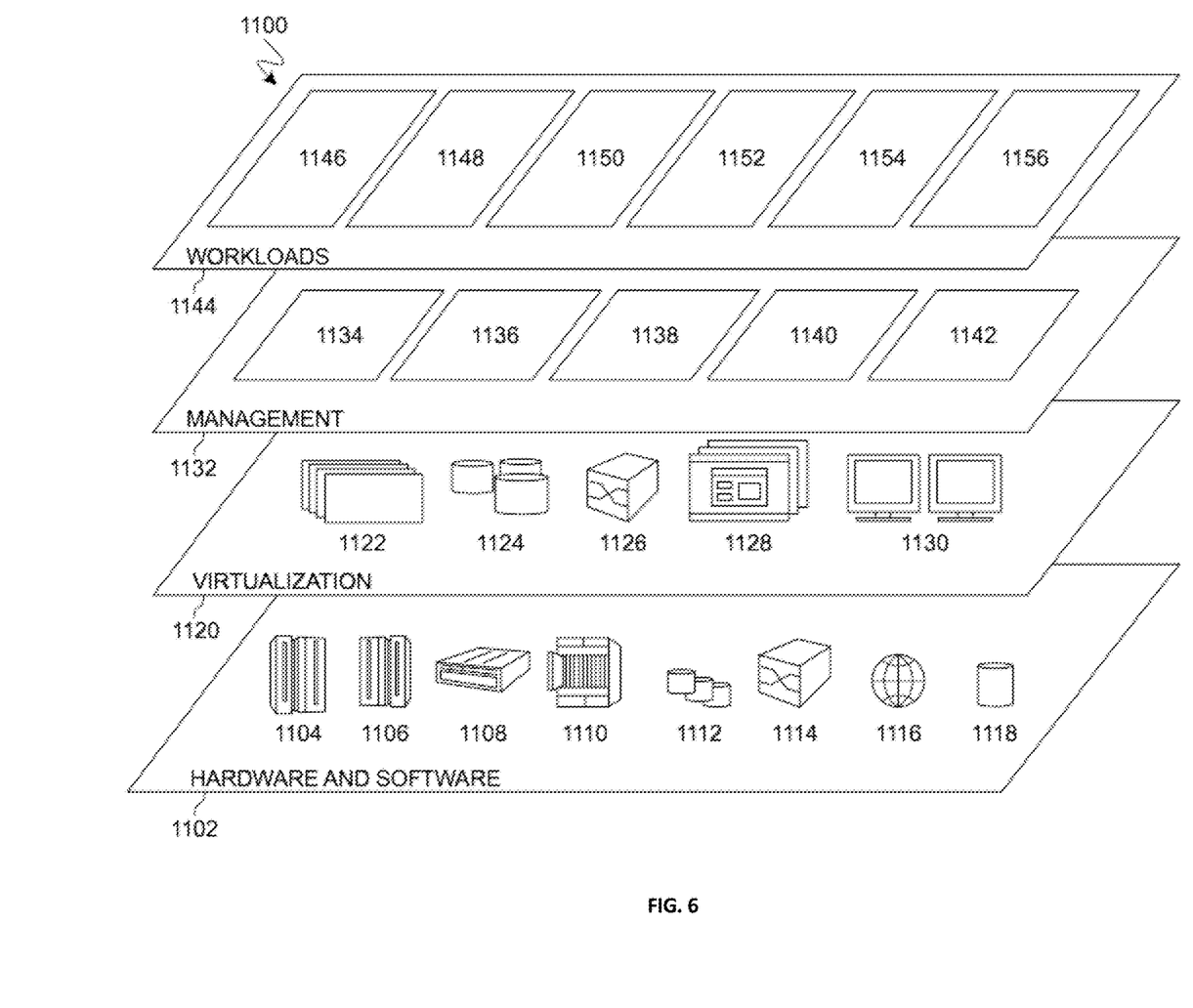
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and blockchain based resource predictions 1156. A blockchain resource program 110*a*, 110*b* provides a way to assist resource producers in forecasting and predicting an accurate resource supply amount to fill fluctuating resource demands.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for cognitive enabled blockchain based resource predictions comprising:
    receiving a request for a prediction of a future resource requirement;
    loading data structures based on the received request;
    classifying collected data based on the data structures;
    predicting the future resource requirement;
    adjusting a priority of the predicted future resource requirement based on the priority being identified via a food-to-population map generated based on an average crop per person; and
    providing notifications to subscribed consumers based on the adjusting of the priority of the predicted future resource requirement.

2. The method of claim 1, wherein the received request includes a request made by a resource producer, a party to a transaction, a stakeholder, a subscriber or a consumer.

3. The method of claim 1, wherein the data structures are associated with a request made by a resource producer, a party to a transaction, a stakeholder, a subscriber or a consumer, wherein the data structure relates to a status of a crop or a status of a product at a manufacturing plant.

4. The method of claim 1, wherein classifying the collected data includes classifying a plurality of data collected from an application programming interface (API) using a static classifier or a dynamic classifier.

5. The method of claim 1, wherein the predicted future resource requirement includes an estimated outcome of a timing outcome and a quality of a crop.

6. The method of claim 1, wherein the adjusted priority is transmitted to a plurality of parties that have an interest in receiving information relating to the prediction of a future resource requirement.

7. The method of claim 1, wherein the notifications are transmitted to a resource producer, a party to the transaction, a stakeholder, a subscriber or a consumer.

8. A computer system for cognitive enabled blockchain based resource predictions, comprising:
    one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
    receiving a request for a prediction of a future resource requirement;
    loading data structures based on the received request;
    classifying collected data based on the data structures;
    predicting the future resource requirement;
    adjusting a priority of the predicted future resource requirement based on the priority being identified via a food-to-population map generated based on an average crop per person; and
    providing notifications to subscribed consumers based on the adjusting of the priority of the predicted future resource requirement.

9. The computer system of claim 8, wherein the received request includes a request made by a resource producer, a party to a transaction, a stakeholder, a subscriber or a consumer.

10. The computer system of claim 8, wherein the data structures are associated with a request made by a resource producer, a party to a transaction, a stakeholder, a subscriber or a consumer, wherein the data structure relates to a status of a crop or a status of a product at a manufacturing plant.

11. The computer system of claim 8, wherein classifying the collected data includes classifying a plurality of data collected from an application programming interface (API) using a static classifier or a dynamic classifier.

12. The computer system of claim 8, wherein the predicted future resource requirement includes an estimated outcome of a timing outcome and a quality of a crop.

13. The computer system of claim 8, wherein the adjusted priority is transmitted to a plurality of parties that have an interest in receiving information relating to the prediction of a future resource requirement.

14. The computer system of claim 8, wherein the notifications are transmitted to a resource producer, a party to a transaction, a stakeholder, a subscriber or a consumer.

15. A computer program product for cognitive enabled blockchain based resource predictions, comprising:
    one or more computer-readable tangible storage media and program instructions stored on at least one of the one or more computer-readable tangible storage media, the program instructions executable by a processor to cause the processor to perform a method comprising:
receiving a request for a prediction of a future resource requirement;
loading data structures based on the received request;
classifying collected data based on the data structures;
predicting the future resource requirement;
adjusting a priority of the predicted future resource requirement based on the priority being identified via a food-to-population map generated based on an average crop per person; and
providing notifications to subscribed consumers based on the adjusting of the priority of the predicted future resource requirement.

16. The computer program product of claim 15, wherein the received request includes a request made by a resource producer, a party to a transaction, a stakeholder, a subscriber or a consumer.

17. The computer program product of claim 15, wherein the data structures are associated with a request made by a resource producer, a party to a transaction, a stakeholder, a subscriber or a consumer, wherein the data structure relates to a status of a crop or a status of a product at a manufacturing plant.

18. The computer program product of claim 15, wherein classifying the collected data includes classifying a plurality of data collected from an application programming interface (API) using a static classifier or a dynamic classifier.

19. The computer program product of claim 15, wherein the predicted future resource requirement includes an estimated outcome of a timing outcome and a quality of a crop.

20. The computer program product of claim 15, wherein the adjusted priority is transmitted to a plurality of parties that have an interest in receiving information relating to the prediction of a future resource requirement.

* * * * *